United States Patent
Busch

(10) Patent No.: US 6,176,496 B1
(45) Date of Patent: Jan. 23, 2001

(54) ARRANGEMENT FOR VERTICALLY CHANGEABLY SUPPORTING A WHEEL CARRIER OR AXLE BEAM

(75) Inventor: Werner Busch, Weinstadt (DE)

(73) Assignee: DaimlerChrysler AG, Stuttgart (DE)

(*) Notice: Under 35 U.S.C. 154(b), the term of this patent shall be extended for 0 days.

(21) Appl. No.: 08/971,718

(22) Filed: Nov. 17, 1997

(30) Foreign Application Priority Data

Nov. 15, 1996 (DE) .............................................. 196 47 300

(51) Int. Cl.[7] .................................................. B60G 17/00
(52) U.S. Cl. .............................. 280/6.157; 280/124.159
(58) Field of Search ...................... 280/6.157, 124.106, 280/124.107, 124.13, 124.131, 124.158, 124.159, 124.162, 124.163

(56) References Cited

U.S. PATENT DOCUMENTS

| | | | |
|---|---|---|---|
| 2,199,063 | * | 4/1940 | Balz ........................ 267/20 |
| 2,208,969 | * | 7/1940 | Focht ........................ 267/187 |
| 3,392,635 | * | 7/1968 | Sperl et al. .................... 92/85 |
| 3,761,110 | * | 9/1973 | Grosseau .................... 280/124.159 |
| 3,963,261 | * | 6/1976 | Hiruma ........................ 280/683 |
| 4,408,773 | * | 10/1983 | Meller et al. .................... 280/833 |
| 4,958,850 | * | 9/1990 | Buma et al. .................... 280/6.157 |
| 4,973,078 | * | 11/1990 | Barthelemy et al. ............. 280/5.511 |
| 5,005,859 | * | 4/1991 | Satoh et al. .................... 280/721 |
| 5,020,826 | * | 6/1991 | Stecklein et al. .............. 280/124.159 |
| 5,575,502 | * | 11/1996 | Oppitz et al. .................... 280/124.166 |
| 5,632,502 | * | 5/1997 | Oppitz et al. .................... 280/124.106 |
| 5,882,017 | * | 3/1999 | Carleer .............................. 280/5.508 |

FOREIGN PATENT DOCUMENTS

| | | | |
|---|---|---|---|
| 1 151 743 | * | 7/1963 | (DE) . |
| 1 755 758 | * | 6/1970 | (DE) . |
| 2 311 651 | * | 9/1974 | (DE) . |
| 25 15 986 | * | 10/1976 | (DE) . |
| 35 25 965 | * | 1/1987 | (DE) . |
| 4 015 777 | * | 11/1990 | (DE) . |
| 39 37 986 | * | 5/1991 | (DE) . |
| 44 43 809 | * | 4/1996 | (DE) . |
| 3-96726 | * | 4/1991 | (JP) . |
| 3-227714 | * | 10/1991 | (JP) . |
| 3-271015 | * | 12/1991 | (JP) . |

OTHER PUBLICATIONS

Buschmann/Koessler, "Manual for Automotive Engineering," Wilhelm Heyne Publishers, München, 1976, p. 729.*

* cited by examiner

*Primary Examiner*—Brian L. Johnson
*Assistant Examiner*—David R. Dunn
(74) *Attorney, Agent, or Firm*—Evenson, McKeown, Edwards & Lenahan, P.L.L.C.

(57) ABSTRACT

An arrangement for vertically adjustably supporting an individual wheel carrier disposed by way of control arms or an axle beam on the body of a motor vehicle. An actuator is fastened on the vehicle body, constructed as a hydraulic motor with at least one pressure space. The actuator has a swivellable actuating shaft which acts upon the wheel carrier, its control arms or the axle beam, by way of a linkage which contains at least one lever arm. The lever arm, upon which the hydraulic actuator acts directly, is designed as a mechanical spring. Also, at least one loaded pressure space of the actuator is hydraulically connected by way of at least one return valve, with a less loaded or unloaded pressure space or a return flow. As an alternative or in addition to the return valve, the loaded pressure space can be connected to a hydraulic accumulator.

6 Claims, 3 Drawing Sheets

ARRANGEMENT FOR VERTICALLY CHANGEABLY SUPPORTING A WHEEL CARRIER OR AXLE BEAM

BACKGROUND AND SUMMARY OF THE INVENTION

This application claims the priority of German patent application 196 47 300.4.

The invention relates to an arrangement for vertically changeably supporting an individual wheel carrier disposed by way of control arms or of an axle beam on the body of a motor vehicle, having an actuator which is fastened on the vehicle body, is constructed as a hydraulic motor with at least one pressure space, and whose swivellable actuating shaft acts by way of a linkage, which contains at least one lever arm, upon the wheel carrier, its control arms or the axle beam.

Such an arrangement is known from the "Manual for Automotive Engineering", Page 729, by Buschmann/Koessler, Wilhelm Heyne Publishers, München, of the year 1976. The arrangement shown there actuates by means of an actuator an approximately vertically aligned lever arm which, by way of a torsion bar parallel to the longitudinal axis of the vehicle, acts upon a second, horizontally situated lever arm which is parallel to the axle on a semiaxle of the vehicle. Between the axle beam of the semiaxle of the vehicle and the lever arm, a bar is installed for the power transmission. The torsion bar is rotatably disposed on the vehicle body in at least one swivel joint. The arrangement requires several suspension points on the vehicle body and a lot of space for the high-expenditure linkage. In addition, it has a stiffness which cannot be controlled.

The invention is based on the need for an arrangement for the vertically changeable support of an individual wheel carrier disposed by way of control arms or of an axle beam on the vehicle body of a motor vehicle which, as an active chassis control, can absorb vibration excitations generated by the road. While it requires little space and a small number of parts, the arrangement must also be secure with respect to an overloading, and should be maintenance-free or at least require low maintenance.

This and other needs have been met according to the present invention by providing an arrangement for vertically changeably supporting a wheel carrier relative to a motor vehicle body, comprising: a hydraulic motor coupled to the vehicle body, said hydraulic motor including at least one loaded hydraulic pressure space which is communicated with at least one of (a) a less- or non-loaded pressure space or a return flow via at least one return valve, and (b) a hydraulic accumulator; and at least one lever arm operatively coupled to each of said hydraulic motor and said wheel carrier such that said lever arm is rotatable relative to said hydraulic motor.

This and other needs have been met according to the present invention by providing a method of vertically changeably supporting a wheel carrier relative to a motor vehicle body, comprising: coupling a hydraulic motor with at least one loaded hydraulic pressure space to the vehicle body; communicating said loaded hydraulic pressure space with at least one of (a) a less- or non-loaded pressure space or a return flow via at least one return valve, and (b) a hydraulic accumulator; and operatively coupling at least one lever arm to each of said hydraulic motor and said wheel carrier such that said lever arm is rotatable relative to said hydraulic motor.

The lever arm, upon which the hydraulic actuator acts directly, is designed as a mechanical spring. Also, at least one loaded pressure space of the actuator is hydraulically connected by way of at least one return valve with a less loaded or non-loaded pressure space or a return flow. By way of the return valve, an unacceptable pressure rise in the loaded pressure space, for example, as the result of a compression of a wheel because of an uneven point in the road, is reduced immediately. As an alternative or in addition to the return valve, the loaded pressure space may also be connected to a hydraulic accumulator which reduces the stiffness of the hydraulic actuator.

The arrangement, which, among other things, can be used as a level control system, supports the corresponding wheel—without the intermediate connection of the regular suspension—elastically by means of mechanical and optionally hydraulic devices. In addition, an overloading of the arrangement which impairs the driving comfort or the operation is prevented by at least one return valve.

The hydraulic motor may, for example, be a swing piston motor with at least one loaded pressure space. A rotating cylinder or the like is also contemplated.

For transmitting the swivel motion of the lever arm to the wheel carrier or its control arms or to the axle beam, a bar can be arranged between the free end of the lever arm and a corresponding linking point on the control arm or axle beam. The bar compensates by means of tilting movements, among others, the displacement of its two linking points during the compression and rebounding of the corresponding wheel. Naturally, instead of the bar, a linking can also be used, among others, which has at least one slide joint.

Other objects, advantages and novel features of the present invention will become apparent from the following detailed description of the invention when considered in conjunction with the accompanying drawings.

DETAILED DESCRIPTION OF THE DRAWINGS

Figure 1:
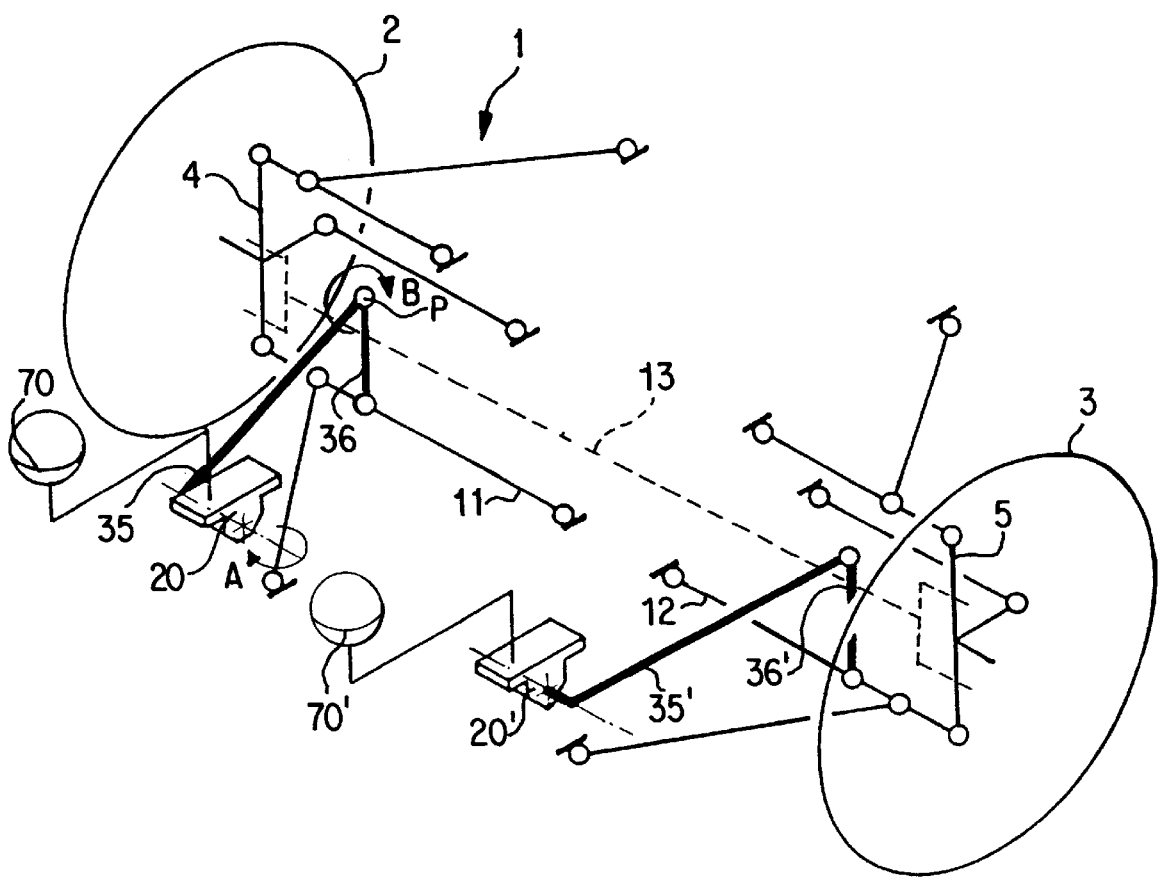
FIG. 1 is a view of an axle with the integrated level control system according to a preferred embodiment of the present invention.

As an example of a preferred embodiment, FIG. 1 shows in a simplified manner a steerable twin control arm axle 1 with two wheels 2 and 3. On each wheel side, the upper and lower control arms guide the corresponding wheel carriers 4 and 5. A level control system acts upon the lower control arm bars 11 and 12 which are approximately in parallel to the axle.

For each axle half, the level control system consists of a hydraulic motor 20, 20' and of a linkage 35, 36; 35', 36'. The individual hydraulic motor 20, 20' fastened on the motor vehicle body 6 has an actuating shaft 31 which can swivel a lever arm 35 up and down from a neutral position which is shown approximately horizontal here. Each lever arm 35, 35' is constructed as a spring-elastic bending bar, and is supported in a hinged manner by way of a respective bar 36, 36' which is largely vertically aligned in this case.

Figure 2:
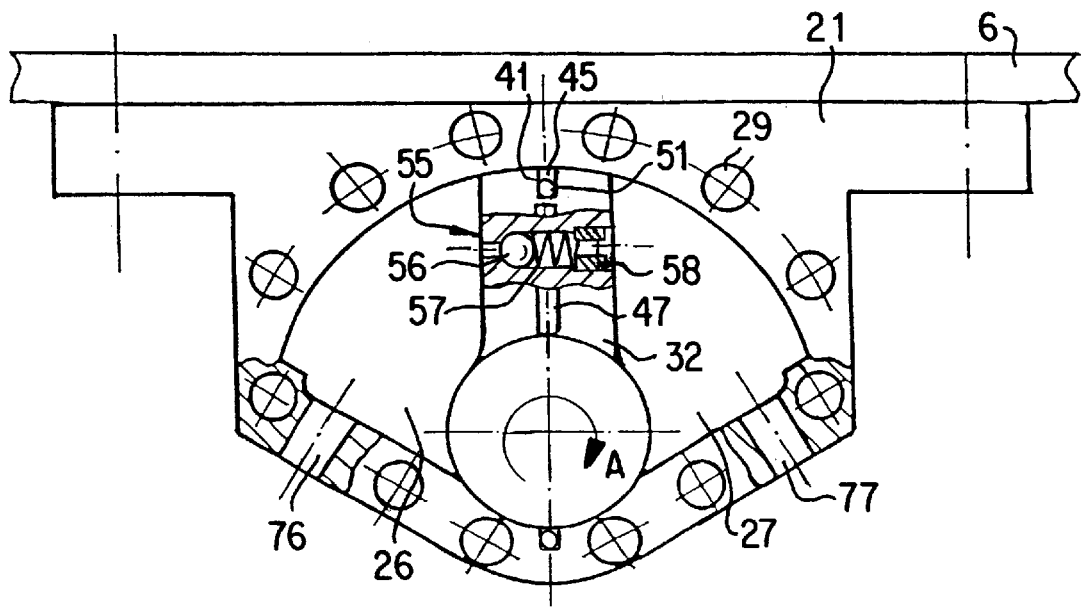
FIG. 2 is a cross-sectional view of the center part of the housing with the swing piston.
Figure 3:
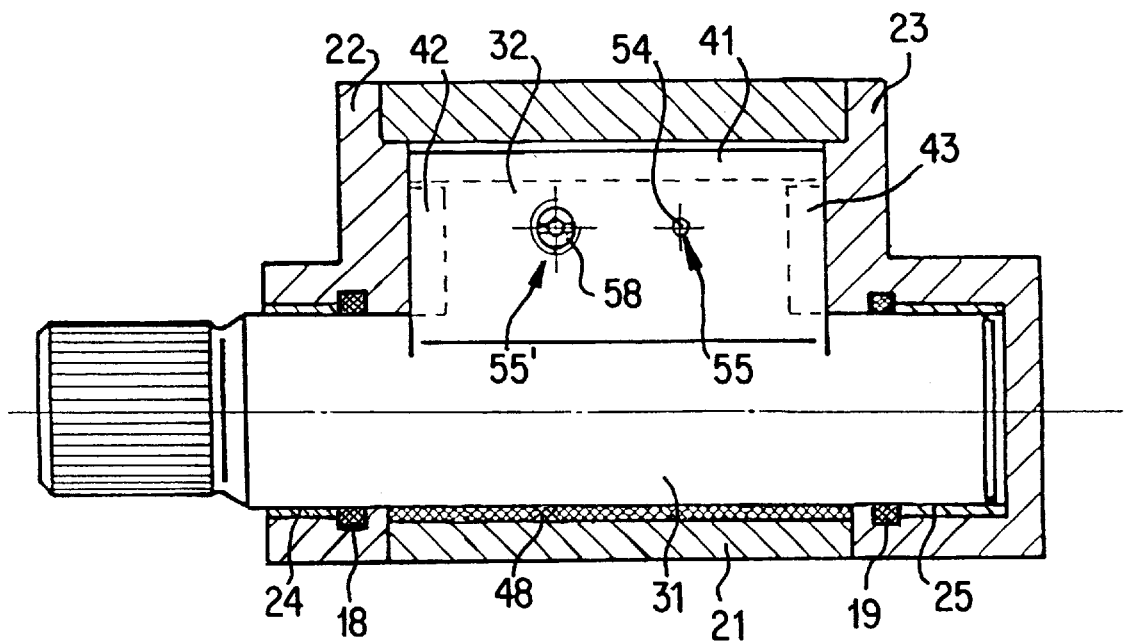
FIG. 3 is a longitudinal sectional view of the swing piston motor.
Figure 4:
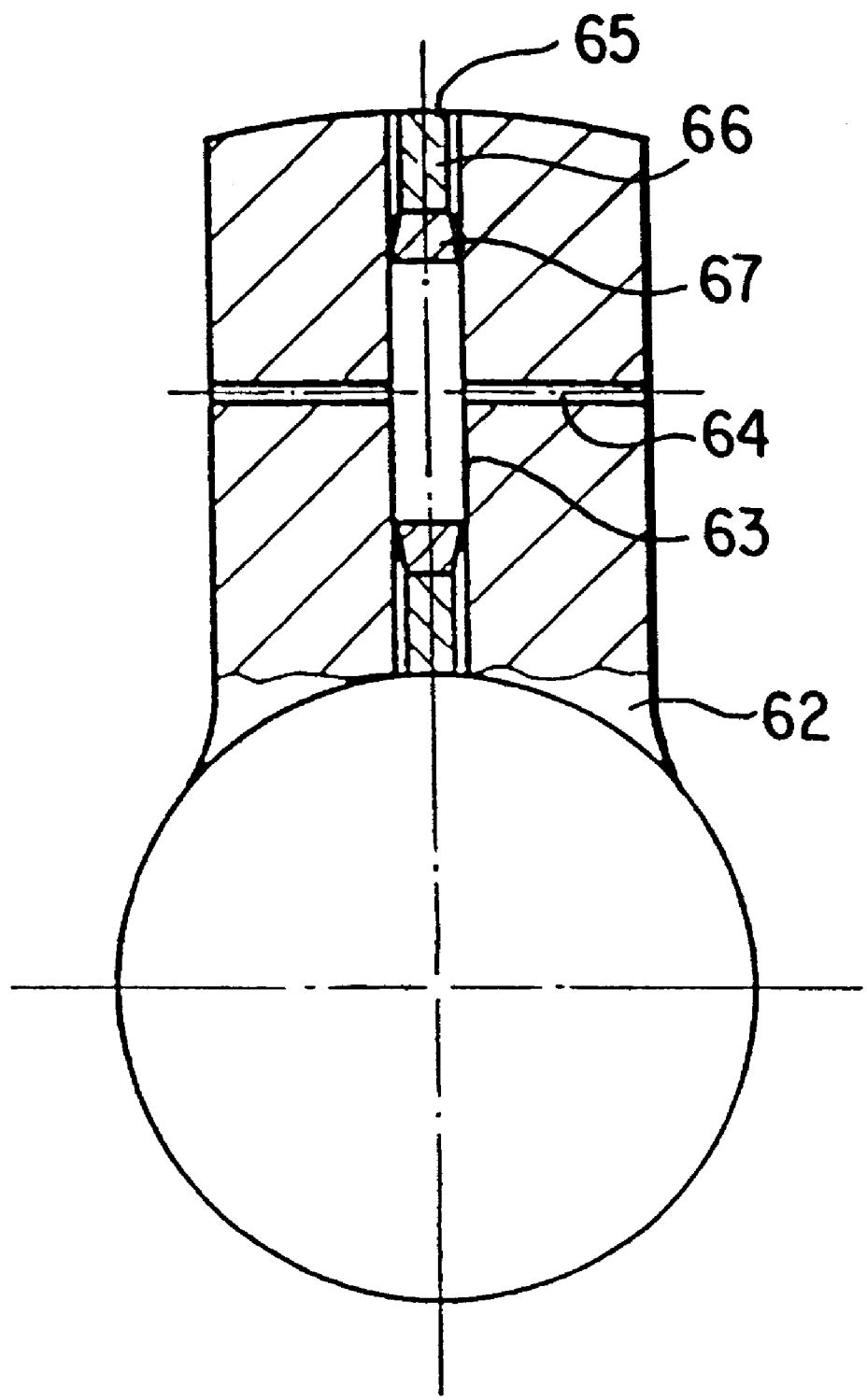
FIG. 4 is a view of the actuating shaft with a frame-shaped piston packing.

FIGS. 2 to 4 show a swing piston motor 20 as the hydraulic motor. The latter has a three-part housing 21 to 23 in which a vane piston or swing piston 32 is enclosed which is disposed on the actuating shaft 31 and divides the housing interior into two pressure spaces 26 and 27.

The housing 21 to 23 consists, for example, of a duct-type or tube-shaped center part 21 which is closed off on its sides by means of one housing cover 22, 23 respectively. According to FIG. 2, the center part 21 is clamped by means of screws, which are not shown, between the housing covers 22, 23, in which case the screws, being situated in longitudinal bores 29, traverse one of the housing covers and the center part in order to be screwed together in the other of the housing covers.

On each side of the swing piston 32, which can be swung, for example, by approximately 120°, the pressure spaces 26 and 27 are defined. In this case, the swing piston separating them has rectangular piston areas as shown in FIG. 3.

In the contour of the swing piston 32, which rests against the cylindrical interior housing wall, a longitudinal groove 41 is machined which is parallel to the center line of the actuating shaft 31 for the mutual sealing-off between the pressure spaces 26 and 27. In the base of the longitudinal groove 41, round elastic material elements 51 made of rubber or of a hydraulic-oil-resistant elastomer are situated which prestress a sealing strip 45. The approximately rectangular sealing strip 41 is, for example, made of PTFE.

Similarly, radial grooves 42 and 43 oriented radially to the center line of the actuating shaft 31 are formed on the lateral faces of the swing piston 32. Round elastic material elements are situated as prestressing elements in each radial groove to bias an adjacent sealing strip, for example 47, into sealing contact with a respective of said housing covers 22, 23.

A sealing element 48 is also arranged between the actuating shaft 31 and the center part 21 of the housing. It can have the same construction as the sealing elements 45, 51 in the longitudinal groove 41.

The actuating shaft 31 with the swing piston 32 is disposed in the housing covers 22, 23, for example, in slide bushes 24, 25. The housing covers 22, 23 are sealed off with respect to the pressure spaces 26, 27 by means of sealing rings 18, 19.

On its end which projects out of the housing 21 to 23, the actuating shaft 31 is configured for connection to the lever arm 35, 35', for example, serrated. The lever arm 35, 35' is connected to the serrated end.

If the body of the motor vehicle is to be lifted, for example, with respect to the wheel 2 from FIG. 1, the pressure space 26 of the hydraulic motor 20 is acted upon by pressure via a hydraulic line connected to a bore 76. The other pressure space 27 is, among other things, connected by way of the bore 77 with a return flow or a hydraulic tank and is therefore relieved from pressure.

The swing piston 32 of hydraulic motor 20 effects a rotational force on the actuating shaft 31 in a clockwise direction A approximately proportionally to the delivered oil pressure value. The lever arm 35, which is attached via a flange to the grooved end of the actuating shaft 31, is biased in clockwise direction A, loading the bar 36 which rests in an articulated manner on the control arm 11. The force applied by the hydraulic motor 20 causes the lever arm 35 to rotate in clockwise direction B about the articulation point P on the bar, 36, lifting the hydraulic motor 20 and the vehicle body connected thereto. The suspension components, hydraulic motor 20', lever arm 35' and bar 36' associated with the other wheel 3 are arranged mirror symmetrically with respect to a longitudinal axis of the vehicle, such that a corresponding lifting force is applied to the hydraulic motor 20' and the vehicle body connected thereto relative to the wheel 3 in tandem with the corresponding system associated with wheel 2.

In order to lower the vehicle body with respect to the wheels 2, 3, the pressure in pressure space 26 is reduced or relieved, allowing the piston to rotate clockwise (opposite direction A), and accordingly causing lever arm 35 to rotate clockwise (opposite direction B) about articulation point P.

The wheel 2 loaded by the hydraulic motor 20 transmits the road disturbances by way of the hydraulic motor 20 and the linkage 35, 36 optionally directly to the vehicle body. In order to reduce the stiffness of the level control system, the lever arm 35 may be constructed as a spiral spring. The pressure space 26 may also be hydraulically connected with a hydraulic accumulator 70, 70', as shown in FIG. 1.

In addition or as an alternative, two return valves 55 and 55' which act against one another can be integrated side-by-side, for example, in the swing piston 32, as shown in FIGS. 2 and 3. The return valve 55 illustrated in FIG. 2 comprises a ball valve 56, a valve spring 57 and an adjusting screw 58. As a rule, the ball valve 56 closes a valve bore 54 leading into the pressure space 26. By means of the valve spring 57 prestressed via the adjusting screw 58, it is sealingly pressed on to its valve seat. As soon as, because of an impact forcing the wheel 2 upward, and a corresponding rotation of the piston 32 counter clockwise as viewed in FIG. 2 due to transmission of the impact force thereto via the bar 36 and the lever arm 35, the pressure in the pressure space 26 exceeds a given limit pressure, the return valve 55 will open up in the direction of the pressure space 27, allowing oil to flow from pressure space 26 to pressure space 27 with reduced resistance. After the disturbance, the oil quantity which flowed out of the pressure space 26 is replaced.

The adjacent return valve 55', as required, relieves the pressure space 27 during the jerky rebounding of the wheel 2 in a downward direction.

FIG. 4 illustrates a swing piston 62 with another piston packing 65 on the actuating shaft 31. The swing piston 62 illustrated there has a center longitudinal slot 63 which extends along the whole piston area. In addition, the two piston halves each have a transverse throttling bore 64. In the longitudinal slot 63, a frame packing 65 is situated which has two areas. Its exterior area which, during a movement of the swing piston 32, slides along the interior housing walls, is a frame 66. The frame 66 has a rectangular individual cross-section. It preferably consists of PTFE and is narrower than the piston slot width. A second frame 67 made of a hydraulic-oil-resistant elastomer rests against the interior sides of the PTFE frame 66 which seals off the pressure spaces 26 and 27 with respect to one another. This frame 67 has a trapezoidal individual cross-section which widens to the interior area of the piston slot. The interior frame sides are acted upon by the pressure medium by way of the throttling transverse bores 64 so that the frame packing 65 is pressed to the outside against the interior walls of the housing.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An arrangement for vertically changeably supporting a wheel carrier relative to a motor vehicle body, comprising:
   a hydraulic motor directly coupled to the vehicle body, said hydraulic motor including at least one loaded hydraulic pressure space which is communicated with a less- or non-loaded pressure space or a return flow via at least one return valve, and at least one lever arm operatively coupled to each of said hydraulic motor and said wheel carrier such that said lever arm is rotatable via said hydraulic motor, wherein said at least one lever arm is operatively coupled to said wheel carrier via control arms of a suspension system.

2. An arrangement according to claim 1, wherein the lever arm is operatively coupled to said control arms via a bar.

3. An arrangement according to claim 2, wherein the bar is aligned approximately in parallel to a direction of movement of the wheel carrier.

4. An arrangement for vertically changeably supporting a wheel carrier relative to a motor vehicle body, comprising:

a hydraulic motor directly coupled to the vehicle body, said hydraulic motor including at least one loaded hydraulic pressure space which is communicated with a less- or non-loaded pressure space or a return flow via at least one return valve, and at least one lever arm operatively coupled to each of said hydraulic motor and said wheel carrier such that said lever arm is rotatable via said hydraulic motor, wherein said at least one lever arm is operatively coupled to said wheel carrier via an axle beam.

5. An arrangement according to claim 4, wherein the lever arm is operatively coupled to said axle beam via a bar.

6. An arrangement according to claim 5, wherein the bar is aligned approximately in parallel to a direction of movement of the axle beam.

* * * * *